United States Patent [19]
Wietsma

[11] Patent Number: 4,657,943
[45] Date of Patent: Apr. 14, 1987

[54] THICKENERS

[75] Inventor: Popke Wietsma, Velp, Netherlands

[73] Assignee: Polysar Financial Services S.A., Fribourg, Switzerland

[21] Appl. No.: 771,583

[22] Filed: Sep. 3, 1985

[30] Foreign Application Priority Data

Sep. 10, 1984 [NL] Netherlands .......................... 8402756

[51] Int. Cl.$^4$ .......................... C08L 33/04; C08K 9/00; C08K 3/34
[52] U.S. Cl. ..................................... 523/216; 523/130; 523/131; 523/132; 524/445; 524/446; 524/447
[58] Field of Search ............... 523/130, 131, 132, 216; 524/445, 446, 447

[56] References Cited

U.S. PATENT DOCUMENTS

| | | | |
|---|---|---|---|
| 2,775,557 | 12/1956 | Morgan | 523/130 |
| 3,541,033 | 11/1970 | Buttrick et al. | 524/447 |
| 3,985,659 | 10/1976 | Felicetta et al. | 524/556 |
| 4,128,528 | 12/1978 | Frisque et al. | 524/445 |
| 4,301,016 | 11/1981 | Carriere et al. | 523/130 |
| 4,351,754 | 9/1982 | Dupre | 524/445 |
| 4,436,862 | 3/1984 | Tetenbaum et al. | 524/447 |

OTHER PUBLICATIONS

Chemical Abstracts 95:98842k, 1981, "Thickenable Polymer Compositions", Rohm and Haas Co.
Union Carbide Corp., "Textile Coatings and Binders—Product Information", UCAR Latex 812.

Primary Examiner—Herbert J. Lilling
Attorney, Agent, or Firm—Stevens, Davis, Miller & Mosher

[57] ABSTRACT

A thickening agent having improved resistance under alkaline conditions comprises a synergistic mixture of an acrylate polymer and bentonite. These thickening agents are useful in textile padding and drilling muds.

9 Claims, 1 Drawing Figure

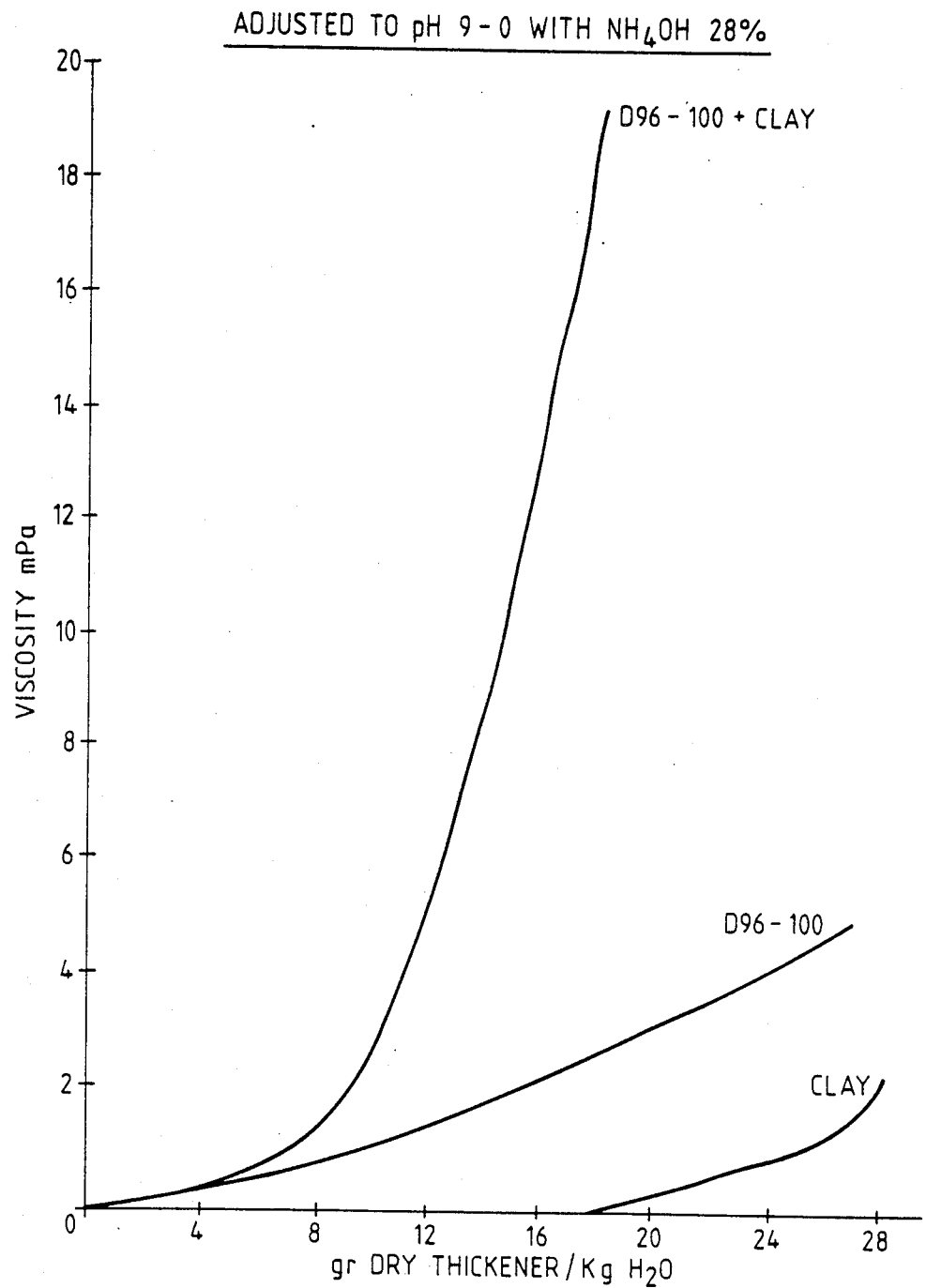

THICKENERS

A wide variety of thickening agents are available. These range from naturally occurring gums and thickeners such as Irish moss, guar gum, gum taraganth, and pectin through to synthetic thickeners. The most common thickening agents are polymers of one or more $C_{3-8}$ ethylenically unsaturated carboxylic acids such as acrylic acid, methacrylic acid and $C_{1-8}$ alkyl or alkoxy esters thereof. Such thickeners have a wide range of applications and are exposed to many environments. Unfortunately many applications call for thickeners having a relatively neutral pH. At such a pH range the thickeners tend to hydrolyse and lose their efficiency as thickening agents. Additionally, many of the environments in which the thickeners are used contain calcium ions. This may result in the formation of insoluble calcium salts which may precipitate the carboxylic acid causing the thickener to loose its usefulness. This is particularly true in the textile printing industry.

Applicant has been unable to locate any specific art relating to the thickening compositions of the present inventions. There is art relating to the formulation of foam backing for textiles. In this art the clay is used as a filler and does not appear to interact with the polyacrylate. An example of such art is the Trade Literature UCAR ® Latex 812 by Union Carbide.

Japanese Kokai No. 81 47,477 published Apr. 30, 1981 (CA 95.98842k) discloses the formation of a gel from a composition of a polymer of polyethylene glycol stearyl ether methacrylate-acrylate methacrylic acid (10:50:40) and hydrated bentonite (2.5 parts) which was neutralized with 1% NaOH. The resulting gel was suitable as a support for an air freshener.

U.S. Pat. No. 4,351,754 issued Sept. 28, 1982, assigned to Rohm and Haas Company, discloses a thickener comprising a water swellable clay mineral; and a polymer comprising 20-50 wt. % of (meth)acrylic acid, 0.5-25 wt. % of a monomer of the formula

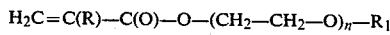

wherein R is H, or $CH_3$, n is at least 2 and $R_1$ contains at least 8 carbon atoms, at least 30 wt. % of a $C_{1-4}$ alkyl (meth)acrylate; and 0 to 1 wt. % of a polyethylenically unsaturated monomer. The clay and the polymer are mixed and neutralized and act as thickeners. The polymers used in the present invention do not contain a monomer of the formula

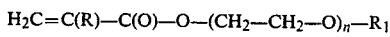

as discussed above.

There is a paint and printing art generally suggesting the individual use of thickening agents such as polyacrylates or treated montmorillonite type clays in solvent based systems. There is no suggestion however that these components should be used together in aqueous based systems. Nor is there any suggestion in the art that the incorporation of clay into such a polymeric thickener will act synergistically with the thickener and stabilize it against hydrolysis.

The present invention provides a thickening agent comprising a dispersion of one or more polymers selected from the group consisting of (A)
 (i) 60-100 weight % of one or more monomers of $C_{1-8}$ alkyl and alkanol esters of $C_{3-8}$ ethylenically unsaturated carboxylic acids; and
 (ii) 40-0 weight % of one or more monomers of a $C_{3-8}$ ethylenically unsaturated carboxylic acid; and
(B) 100% of one or more monomers of a $C_{3-8}$ ethylenically unsaturated carboxylic acid;

and from about 15 to about 45 parts by dry weight per 100 parts by dry weight of said polymer of one or more clays selected from the group aluminum silicate clays, montmorillonite clays and bentonite, which clays may have been chemically treated.

The polyacrylate thickeners may be copolymers of a major amount of a $C_{1-8}$ alkyl or alkanol esters of a $C_{3-8}$ ethylenically unsaturated carboxylic acid and a minor amount of $C_{3-8}$ ethylenically unsaturated carboxylic acid. Generally the polymer comprises from about 60 to 100 weight % of $C_{1-8}$ alkyl or alkanol esters of one or more $C_{3-8}$ ethylenically unsaturated carboxylic acids and up to about 40 weight % of one or more $C_{3-8}$ ethylenically unsaturated carboxylic acids. Perferred $C_{3-8}$ ethylenically unsaturated acids are as acrylic or methacrylic acid. Perfered polymers consist of from 70 to 100% of a $C_{1-8}$ alkyl or alkanol ester of acrylic or methacrylic acid such as methyl, ethyl, propyl butyl, pentyl, hexyl, heptyl octyl, ethyl hexyl, and hydroxy ethyl acrylate or methacrylate. The balance of the polymer usually consists of acrylic or methacrylic acid. Homopolymers of $C_{3-8}$ ethylenically unsaturated carboxylic acids such as acrylic or methacrylic acids are also useful in accordance with the present invention. The polymers may have a molecular weight over a broad range. For some applications relatively low molecular weights from about 85,000 to 120,000 (preferably about 100,000) are useful. In other applications polymers having molecular weights in the millions are useful.

The clay used in accordance with the present invention is selected from the group aluminum silicate clays, montmorillonite clays, and bentonite. The preferred clay is bentonite. The clay may be chemically treated so that it has a greater ability to hold water or so that it is water swellable.

The clay is added to the polymer prior to adjusting the pH. The clay may be used in an amount from about 15 to about 45 parts by dry weight per 100 parts by dry weight of polymer. The preferred range is from about 30 to 40 parts by dry weight per 100 parts by weight of polymer with 35 parts by dry weight of clay being preferred.

The polymer is blended with the clay using conventional mixing equipment. Subsequent to mixing, the thickener is then adjusted to a pH of greater than 6.5, preferably from about 7 to 9. Convenient bases include KOH, NaOH, $NH_4OH$ and organic amines such as $C_{1-4}$ lower alkyl amines. The resulting thickener may then be compounded to provide a textile printing composition. The printing composition may comprise from about 20 to 75 parts by dry weight of the thickener of the present invention, from about 10 to 50 parts by dry weight of an organic pigment or dye; and from about 100 to 200 parts by weight of water, an organic diluent or a mixture thereof.

The resulting pigment dispersion may be used to print a wide variety of textiles including cottons, polyesters, polyamides, and reconstituted cellulose (i.e. rayon). The textiles may also be mixtures of the above materials such as from about 25 to 75% cotton and 75 to 25% synthetic fiber. The procedures used in printing textiles are well known to those in the textile arts. The textile may be printed with suitable equipment such as a screen printer or a knife. The pigment is then set usually by a heat treatment.

The thickener compositions of the present invention contain Bentonite. One useful application for such thickeners is in aqueous or oil based drilling muds for oil and gas wells. These muds contain a thickener, bentonite, a loading or weighting agent such as $BaSO_4$, $FeTiO_3$, or $Fe_2O_3$, and water. Further ingredients may be added to the drilling mud. Typically the drilling mud may contain from about 0.1 to about 10%, preferably 0.1 to about 3% by weight of thickener.

The following examples are intended to illustrate the present invention without limiting it.

The viscosity of a neutralized solution of a polyacrylate thickener sold under the trade name D96-100 by Polysar Nederland b.v. was compared with the viscosity of various blends of D96-100 and bentonite which was subsequently neutralized.

The results are presented in Table I. In the examples ener was measured before and after the addition of the clay. The results are set forth in Table III, which shows that the synergistic effect is not obtained unless the pH adjustment is done after the blending.

Applicant made a textile printing composition comprising:

D96-100 (thickener): 35.5
$H_2O$: 168.75
Benaqua 4%: 35.5
Acrylic latex (binder): 30.0
Neopralac blue BDN (trade name): 15.0
$NH_4OH$: 0.9
Brf RVT 20 rpm visc. mPa.s: 10000

On a Mini MDK printer with varying rake from 10 to 45, varying pressure from 6 to 2 and varying speed from 6 to 8, applicant was able to obtain:

(1) good print definition
(2) satisfactory penetration, and
(3) better than average colour yield on textiles of cotton (156 g/m$^2$), polyester (131 g/m$^2$) and polyester/cotton 65/35 (80 g/m$^2$). The prints were cured at 160° C. for 3'.

TABLE I

| D96-100 | 4.0 | 4.0 | 6.0 | 6.0 | 4.0 | 6.0 | 4.0 |
|---|---|---|---|---|---|---|---|
| Wet at about 30% solids | | | | | | | |
| $H_2O$ | 145.6 | 145.35 | 143 | 143 | 145.1 | 143 | 144.6 |
| Bentonite | — | 0.25 | 0.45 | 0.6 | 0.5 | 0.75 | 1.0 |
| $NH_4OH$ 28% | 0.4 | 0.4 | 0.5 | 0.5 | 0.4 | 0.5 | 0.4 |
| Total Solids % | 0.9 | 1.07 | | | 1.23 | | 1.57 |
| Brookfield Viscometer RVT 20 rpm visc. mPa.s | 2150 | 3650 | 14000 | 19000 | 4550 | 24500 | 11200 |
| After | | | | | | | |
| 1 h | 1850 | 3850 | 13900 | 19000 | 4900 | 24500 | 12600 |
| 2 h | 1700 | 3700 | 13800 | 19000 | 5000 | 24500 | 13000 |
| 1 d | 1400 | 3550 | 13000 | 19000 | 5000 | 24500 | 13400 |
| 2 d | 1300 | 3300 | 12600 | 19000 | 5050 | 24500 | 13600 |
| 7 d | 1000 | 2200 | 12000 | 19000 | 5050 | 24500 | 14000 |
| % Bentonite on D96-100 | 0 | 18 | 22.5 | 30.0 | 36 | 37.5 | 72 | the amounts of bentonite and thickener are in parts by dry weight unless otherwise indicated.

This table shows that mixing from about 15 to 45 parts by weight of clay per 100 parts by dry weight of a polymer prior to pH adjustment stabilizes the viscosity of the thickener. These results suggest significantly improved viscosity is obtained when the polymer is used in conjunction with the clay.

Applicant then conducted a test to determine if there is any synergestic interaction between the polymer and the clay prior to pH adjustment. Applicant measured the viscosity of dilute solutions of the polymer D96-100 and a mixture of the polymer and various amounts of Bentonite. The mixture of polymer and Bentonite was subsequently adjusted to a pH of about 9 with $NH_4OH$. The clay by itself does not exhibit an influence on the viscosity of an aqueous system until it is present in amounts of about 30 gm/100 gm $H_2O$. When clay is used in conjunction with the polymer, strong synergistic results are obtained as shown by the results in Table II.

BRIEF DESCRIPTION OF DRAWING

A plot of the viscosity of water containing various amounts of Bentonite per se, D96-100 per se and a mixture of D96-100 and 30 percent Bentonite subsequently adjusted to a pH of 9 is shown in FIG. 1.

To illustrate the effect of pH adjustment of the thickener, applicant mixed various amounts of pre-pH-adjusted polymer with clay. The viscosity of the thick-

TABLE II

| 100% D96-100 gr/dry/kg $H_2O$ | | Brookfield Viscometer RVT 20 rpm visc. |
|---|---|---|
| 6.8 | | 650 mPa.s |
| 13.6 | | 1700 mPa.s |
| 20.4 | | 3200 mPa.s |
| 27.2 | | 5000 mPa.s |

| 100% D96-100 gr dry/kg $H_2O$ | | 30% Bentonite gr dry/kg $H_2O$ | Brookfield Viscometer RVT 20 rpm visc. mPa.s |
|---|---|---|---|
| 6.67 | + | 2 | 1600 |
| 9.06 | + | 2.67 | 5000 |
| 11.3 | + | 3.33 | 9200 |
| 13.6 | + | 4.0 | 19000 |

| 100% D96-100 gr dry/kg $H_2O$ | | 40% Bentonite gr dry/kg $H_2O$ | Brookfield Viscometer RVT 20 rpm. visc. mPa.s |
|---|---|---|---|
| 6.67 | + | 2.67 | 1200 |
| 9.06 | + | 3.3 | 3000 |
| 11.3 | + | 4.53 | 11000 |
| 13.6 | + | 5.47 | 22000 |

| 100% D96-100 gr dry/kg $H_2O$ | | 50% Bentonite gr dry/kg $H_2O$ | Brookfield Viscometer RVT 20 rpm visc. mPa.s |
|---|---|---|---|
| 6.67 | + | 3.33 | 1150 |
| 9.06 | + | 4.53 | 3200 |
| 11.3 | + | 5.57 | 12000 |
| 13.6 | + | 6.8 | 24000 |

TABLE III

| D96-100 | 4.0 | 5.0 | 6.0 | 12.0 |
|---|---|---|---|---|
| $H_2O$ | 145.6 | 144.5 | 143.4 | 136.8 |
| $NH_4OH$ | 0.4 | 0.5 | 0.6 | 1.2 |

TABLE III-continued

| | | | | |
|---|---|---|---|---|
| Brookfield Viscometer RVT 20 rpm visc. mPa.s (no Bentonite) | 2100 | 3600 | 4250 | 5350 |
| Bentonite | 0.4 | 0.5 | 0.6 | 1.2 |
| Brookfield Viscometer RVT 20 rpm visc. mPa.s | 2100 | 3800 | 4450 | 5600 |

What is claimed is:

1. A thickening agent comprising a dispersion of at least one polymer having a molecular weight from about 85,000 to 120,000, and being selected from the group consisting of:
   (A) a copolymer consisting essentially of
       (i) 60-100 weight percent of at least one monomer of an ester selected from the group consisting of $C_{1-8}$ alkyl esters of $C_{3-8}$ ethylenically unsaturated carboxylic acids; and
       (ii) 40-0 weight percent of at least one monomer selected from the group consisting of $C_{3-8}$ ethylenically unsaturated carboxylic acid monomers, and
   (B) polymers of 100 weight percent of at least one monomer selected from the group consisting of $C_{3-8}$ ethylenically unsaturated carboxylic acid monomers; and from about 15 to about 45 parts by dry weight per 100 parts by dry weight of said polymer of at least one clay selected from the group consisting of aluminum silicate clays, montmorillonite clays and bentonite;
said thickener being adjusted to a pH of greater than 6.5 subsequent to the mixing of said polymer and said clay.

2. A thickening agent comprising a dispersion of at least one polymer having a molecular weight from about 85,000 to 120,000, and being selected from the group consisting of:
   (A) a copolymer consisting essentially of
       (i) 60-100 weight percent of at least one monomer of an ester selected from the group consisting of $C_{1-8}$ alkyl esters of $C_{3-8}$ ethylenically unsaturated carboxylic acids; and
       (ii) 40-0 weight percent of at least one monomer selected from the group consisting of $C_{3-8}$ ethylenically unsaturated carboxylic acid monomers, and
   (B) polymers of 100 weight percent of at least one monomer selected from the group consisting of $C_{3-8}$ ethylenically unsaturated carboxylic acid monomers; and from about 15 to about 45 parts by dry weight per 100 parts by dry weight of said polymer of at least one chemically treated clay selected from the group consisting of aluminum silicate clays, montmorillonite clays and bentonite;
said thickener being adjusted to a pH of greater than 6.5 subsequent to the mixing of said polymer and said clay.

3. The thickener according to claim 1 wherein the polymer consists of from 70 to 100 wt. % of a $C_{1-8}$ alkyl ester of acrylic acid and the balance at least one of a $C_{3-8}$ ethylenically unsaturated acid, said thickener having a pH of from 6.5 to 9.

4. The thickener according to claim 1 wherein the polymer consists of from 70 to 100 wt. % of a $C_{1-8}$ alkyl ester of methacrylic acid and the balance at least one of a $C_{3-8}$ ethylinically unsaturated acid, said thickener having a pH of from 6.5 to 9.

5. The thickener according to claim 1 wherein the polymer consists of from 70 to 100 wt. % of a $C_{1-8}$ alkanol ester of acrylic acid and the balance at least one of a $C_{3-8}$ ethylinically unsaturated acid, said thickener having a pH of from 6.5 to 9.

6. The thickener according to claim 1 wherein the polymer consists of from 70 to 100 wt. % of a $C_{1-8}$ alkanol ester of methacrylic acid and the balance at least one of a $C_{3-8}$ ethylinically unsaturated acid, said thickener having a pH of from 6.5 to 9.

7. The thickener according to claim 3 having a pH of from 7 to 8 with a base selected from the group consisting of NaOH, KOH, $Ca(OH)_2$, $NH_4OH$ and an organic amine.

8. The thickener according to claim 7 wherein the clay is a chemically treated bentonite.

9. The thickener according to claim 8 wherein the chemically treated bentonite is present in an amount of 30 to 40 parts by dry weight per 100 parts by dry weight of polymer.

* * * * *